Patented Feb. 24, 1948

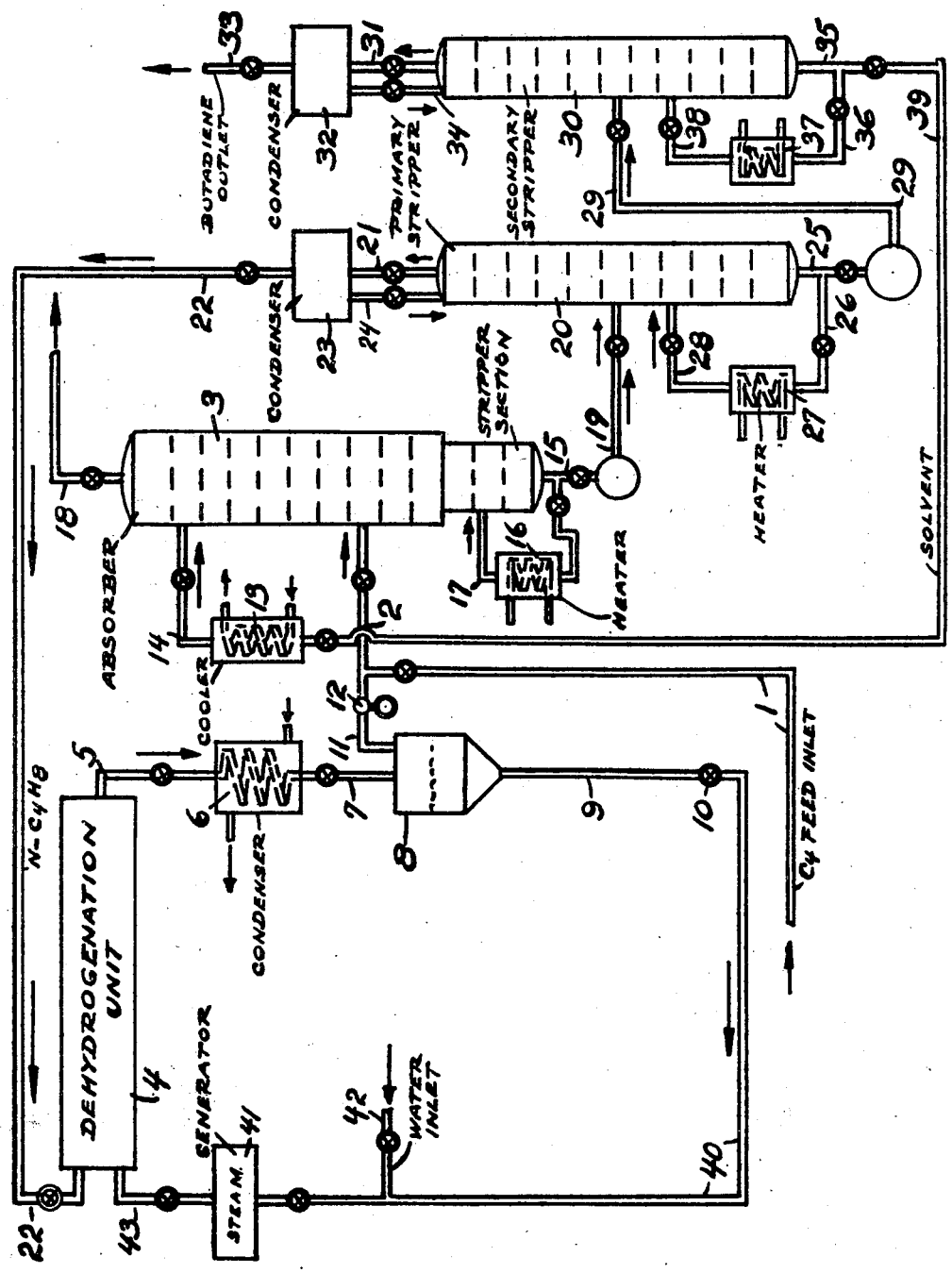

2,436,600

UNITED STATES PATENT OFFICE 2,436,600

PRODUCTION AND CONCENTRATION OF BUTADIENE

Edward D. Reeves, Cranford, N. J., assignor to Standard Oil Development Company, a corporation of Delaware Application October 31, 1942, Serial No. 464,084

7 Claims. (Cl. 260—680)

This invention relates to improvements in the production, separation and concentration of olefins, particularly in the production of butadiene from low molecular weight hydrocarbon gases, containing substantial quantities of hydrocarbons having 4 carbon atoms.

The source of the hydrocarbon feed is immaterial as it may be obtained from many sources. For example, it may have been derived from thermal or catalytic cracking processes, from the reforming or hydroforming of naphthas, or from destructive hydrogenation or distillation processes, or from any combination of these.

Although many methods have been suggested for the production of butadiene, all of them entail a series of complicated and expensive operations in which delicate balances must be maintained if the process is to be efficient and economical. For example, a typical method of obtaining butadiene from gaseous hydrocarbons comprises first superfractionating the feedstock to obtain a stream of hydrocarbons containing principally $C_4$ type hydrocarbons. This material is then passed through a dehydrogenation zone which may be either thermal or catalytic to effect the conversion of olefins to diolefins. In general, there is considerable degradation present and the selectivity is low since the feedstock contains not only $C_4$ olefins but also $C_4$ saturates as well as some diolefins. Even with careful temperature control exercised in the dehydrogenation step, this step is characterized by many disadvantages. For example, the prevailing presence of diolefins in the feed leads to high coke, gas and polymer formations. Excess gas formation also results and imposes a consequent load on the purification system.

Following dehydrogenation the products thereof are generally passed through an absorption system for the removal of hydrogen and other light gases such as methane, ethane, ethylene, propane and propylenes. This is performed by means of an oil scrubber operating at high pressure and at a temperature favorable for the rejection of the above-named gases. The higher molecular weight hydrocarbons are absorbed by the oil and are withdrawn from the bottom of the tower as so-called fat oil from which they are stripped in a second tower, the lean oil being recycled to the absorption tower. The hydrocarbon gases purified by the absorption step and containing principally hydrocarbons having 4 carbon atoms are then passed into an extraction tower wherein the butadiene is selectively removed by means of a solvent. One such solvent capable of differentiating the diolefin from olefins comprises an ammoniacal solution of cuprous acetate. The diolefin, in this case butadiene, is segregated by stripping the extract solution. The rejected hydrocarbons are removed overhead and in general are recycled as such to the dehydrogenation zone for ultimate conversion of the olefins to butadiene.

Recycling of the rejected hydrocarbons to the dehydrogenation zone is characterized by a serious disadvantage since isobutylene as well as butane, which is contained in the recycle stream, passes through the dehydrogenation zone without any great change of structure. Thus it tends to build up in concentration, and to prevent excessive build-up, it is the general practice to bleed off in a continuous manner small amounts of recycle gas. This means, of course, that over a long period of operation substantial quantities of valuable n-butenes are also discarded and lost.

One of the objects of the present invention is to eliminate this waste of valuable material which at present is of such strategic importance.

Another object of this invention is to reduce the number of separate units which are required in present day practice by an advantageous and economical combination of steps which will be described more completely below.

A further object of the invention is to obtain a substantial improvement in the operation of the dehydrogenation step whereby higher yields of butadiene concurrent with improved selectivities are obtained.

A further object of this invention is to obtain a stream of hydrocarbons rich in isobutylene which may be used as raw material for the manufacture of butyl-type polymers, for the manufacture of super-aviation fuel by either alkylation or polymerization and hydrogenation processes.

These and further objects of the invention will be understood by the detailed description with reference to the drawing which portrays the flow plan of a process for producing butadiene from a gaseous mixture of hydrocarbons in which hydrocarbons containing 4 carbon atoms are predominant.

With reference to the drawing, numeral 1 designates a conduit through which the gaseous feedstock, under pressure, is introduced into the system through line 2, wherein it becomes mixed with the hydrocarbon products obtained by dehydrogenation in unit 4. The hydrocarbon mixture in line 2 is discharged into the lower part of absorber 3, the purpose of which is to separate butadiene from the gas mixture comprising hydrogen, methane, ethane, ethylene, propane, propylene, n-butane, isobutane, n-butenes, isobutylene and traces of higher molecular weight hydrocarbons. The absorption step may be conducted according to liquid-liquid or vapor-liquid technique in which any of a variety of solvents may be used but for purposes of illustration, a solvent comprising a solution of monomethylamine containing between about 15-30% water is preferred. Although satisfactory separation may be obtained with liquid-liquid extraction, it is preferred to keep the solvent in the liquid phase and the feed, to be extracted, in the vapor phase. This is preferable as it is more difficult to obtain the necessary equilibrium extraction stages in a column for liquid-liquid extraction than it is to obtain the equilibrium distillation plates needed in vapor-liquid extraction.

The hydrocarbon mixture in line 2 enters the absorber 3 at a temperature of about 80° F., having been heated by either indirect heat exchange or direct heat exchange with the hot products of dehydrogenation, and is contacted with a downward flowing solution of monomethylamine and water. The effect of this solution or solvent is to markedly change the normal boiling points, or volatility relationships that normally exist between the hydrocarbon mixture. The net overall result is equivalent to making butadiene boil higher than all the other 4-carbon atom hydrocarbons. This difference in boiling point or, more accurately, in vapor pressure, is sufficient to separate butadiene from the other hydrocarbons with the exception of cis-butene-2.

The unabsorbed gases, such as hydrogen, methane, ethane, ethylene, propane, propylene, isobutane, n-butane, isobutylene and butene-1 are rejected overhead and discharged through line 18. If desired, these unabsorbed gases may be segregated and purified for addition feed to alkylation, isomerization or polymerization processes.

Satisfactory operating conditions for the absorber, using an absorption menstruum comprising about 20-30% water in monomethylamine, are as follows:

|  | Broad | Preferred |
| --- | --- | --- |
| Temperature, °F | 60-100 | 70-90 |
| Pressure, p. s. i. | 20-120 | 30-50 |
| Solvent/Hydrocarbon ratio by wt. based on feed | 5:1 to 30:1 | 12:1 to 18:1 |

The lower portion of the absorption tower is maintained at a slightly higher temperature, and is utilized as a stripping section wherein isobutylene which is partly absorbed or dissolved in the solvent solution is stripped out of the solution. This is attained by means of heating a portion of the solution withdrawn from the tower through pipe 15, in heater 16 and recycling it to the tower by means of pipe 17.

The major portion of the fat liquor withdrawn through pipe 15 from absorber 3 is passed through pipe 19 to the primary stripping tower 20. The function of stripping tower 20 is to effect the separation of the cis-butene-2 contained in the fat liquor from butadiene and this is accomplished by maintaining a tower temperature of between about 100–150° F. and a pressure above about 70 lbs. per square inch and below about 250 pounds per square inch. The temperature is obtained by such means as a heating element situated in the bottom of the tower or preferably by means of recycling and heating a portion of the solution withdrawn at the bottom through pipes 25 and 26, heater 27 and pipe 28. The stream withdrawn through pipe 26 may comprise between about 5-30% by volume of the total withdrawn through line 25 and may be heated in heater 27 to temperatures between about 120 and 200° F.

The material rejected overhead through line 21 is rich in cis-butene-2 and since it also contains some butadiene, it is economically necessary to condense the overhead stream in condenser 23 and return a part thereof as reflux through pipe 24. The reflux ratio may vary between about 0.5:1 to 20:1 or more.

Referring to the material withdrawn as bottoms from primary stripper 20, it is passed through pipes 25 and 29 to a secondary stripper 30 wherein substantially pure butadiene is removed as overhead through pipe 31, condenser 32 and pipe 33.

Stripping tower 30 is maintained at a temperature above that of stripping tower 20 and may be between about 110 and 180° F. and under a pressure of more than about 80 lbs. per square inch. In order to obtain butadiene in high purity, it is essential to condense the vapors removed overhead in pipe 31 by condenser 32 and return a portion of the condensate as reflux by means of pipe 34. Suitable reflux ratios are between 0.5 and 20:1.

The absorbent solution substantially free of butadiene is removed from stripping tower 30 by means of pipe 35. It is preferable to remove a part of the absorbent solution from pipe 35 by means of pipe 36 and heat it in heater 37 before recycling it to the tower through pipe 38. This is done for two reasons, since it is a convenient way of maintaining temperature in tower 29 as well as assuring thorough stripping of hydrocarbons from the absorbing medium. The main portion of the solution withdrawn through pipe 35 is passed through pipe 39, cooler 13 and pipe 14 to absorber 3 where it again contacts the hydrocarbon feed.

Referring to the butene-2 in pipe 22, this is fed to dehydrogenation zone 4 wherein the butene-2 is converted to butadiene in high yield and high selectivity in the presence of a catalyst and substantial quantities of steam.

The catalyst which may be preformed as by tabletting, pilling or extruding, or even be in the form of irregular shaped granules, may be supported on a perforated plate as a fixed bed of catalyst. It is preferred to employ it in a powdered condition having a particle size range between about 100 and 400 mesh. In this preferred modification, the powdered catalyst is maintained as a suspension having a bulk density between about 5 to 40 pounds per cubic foot.

Satisfactory temperatures for the conversion of butenes to butadiene is above about 1000° F. and below about 1300° F. and is preferably between 1050° F. and 1250° F. The total pressure is preferably slightly above atmospheric, although subatmospheric or even pressures up to about 100 lbs. per square inch may be used.

Although satisfactory conversion under subatmospheric pressures maintained for example by means of steam ejectors or other types of vacuum pumps may be obtained, it is preferable to obtain low hydrocarbon partial pressures by means of an inert diluent such as inert gases, low molecular weight hydrocarbons, benzene or steam. The latter inert is preferred as it was found to possess several advantages. It is not only readily separated from the products of dehydrogenation but it also is effective in prolonging the period of catalyst activity since it removes carbon deposits from the catalyst via the well-known water-gas reaction.

The quantity of steam admitted to dehydrogenation zone 4 is between about 3 to 20 times as much by volume as the hydrocarbon feed and may be at a temperature equal to that of the feed or may even be superheated to temperatures above 1300° F. One advantage of superheating is that thermal degradation of hydrocarbon feed is avoided since it is unnecessary to preheat the hydrocarbon feed to excessive temperatures. Suitable conversion temperatures are obtained by merely mixing superheated steam with slightly heated or even unheated hydrocarbon feed.

The ratio of steam to hydrocarbon may be varied between about 2:1 to as high as 25:1. However, it was found that while satisfactory dehydrogenation is obtained at ratios of between 5:1 and 9:1, steam to hydrocarbon ratios of 15 or 20:1 may be used with notable success. One advantage of operating at high ratios is that the conversion of the dehydrogenation reaction is improved without serious diminution in selectivity. For example, at a temperature of 1050° F., using a catalyst which will be hereafter described further, a conversion of 19% with selectivity of 79% using a steam to hydrocarbon ratio of 5:1 is obtained. When the ratio was increased to 20, the percent conversion increased to 29% while the selectivity was 74%. The percent yield of butadiene in the first case was 15, while the yield of butadiene was increased to 21% when the steam/hydrocarbon ratio was increased to 21:1.

The time of contact that the hydrocarbon is associated with the catalyst may vary and is principally dependent upon the conversion temperature. In general, the lower the temperature, the longer is the time required for the attainment of a conversion level. For a conversion temperature of 1050° F., a contact time between 1 to 15 seconds may be employed depending on the catalyst activity as well as the catalyst age.

The catalyst used in the above experiments consisted of a mixture of magnesia, iron oxide, copper oxide and potassium oxide. Although excellent results have been obtained with the above-described catalyst, other catalyst compositions may also be employed. For example, good results have been obtained with mixtures of zirconia, iron oxide, copper oxide and potassium oxide, combinations of alumina, chromia and vanadia with or without suitable stabilizers such as thoria, zinc, silver and promoters such as oxides of sodium and potassium.

After a period of on-stream operation, the catalyst becomes contaminated with carbonaceous deposits and its regeneration is necessary. This is accomplished by steam, a mixture of steam and air or air alone at a temperature below about 1500° F. Excess temperatures are to be avoided since this results in rapid deterioration of the catalyst.

The products of dehydrogenation are removed from unit 4 and pass through pipe 5 to condenser 6, where substantially only the steam is condensed. The liquid plus gaseous products are withdrawn from condenser 6 through line 7 to separator 8 where water is separated from the gaseous products. The condensed water is recycled to the dehydrogenating unit 4 via pipe 9, valve 10, pipe 40, steam generator 41 and pipe 43. Extraneous water, as required for make-up, may be admitted to the system by way of pipe 42. It is to be understood, of course, that prior to entering steam generator 41, the water may be passed through the usual heat exchange equipment. For example, the water may be preheated by indirect heat exchange with the hot products issuing from the dehydrogenation unit.

Referring to separator 8, the uncondensed gases or vapors are removed through pipe 11, compressed in compressor 12 and thence discharged into absorber 3.

Referring to the gases rejected from absorber 3 through line 18, these gases may be fractionated for the removal of material boiling below the $C_4$ boiling range and the remaining hydrocarbons which have been enriched in isobutylene may then be charged to a selective polymerization zone for the production of diisobutylene or a mixed copolymer product. The polymer can then be either hydrogenated to super-aviation blending material or else can be converted to substantially pure isobutylene for rubber synthesis feed.

The hydrocarbons which pass through the polymerization zone unchanged are n-butane and isobutane. By superfractionation in standard type distillation equipment it is possible to obtain a stream containing principally isobutane and another stream containing principally butane. The butane stream may be passed to an isomerization unit (not shown) in order to obtain additional quantities of isobutane which can be combined with the isobutane obtained by superfractionation and may be used for alkylation purposes.

I claim:

1. The method of preventing excessive build-up of isobutylene content in the recycle stock of a dehydrogenation system for the production of butadiene from n-butene wherein isobutylene is produced as a by-product, which comprises combining the effluent of a dehydrogenation zone with fresh feed stock, introducing said combined effluent and stock containing n-butene, isobutylene and butadiene into an absorbing zone, introducing into said zone a preferential solvent for butadiene and n-butene, thereby separating said isobutylene and withdrawing it from said absorbing zone, passing said solution with absorbed butadiene and n-butene to a stripping zone, stripping said n-butene and recycling it to said dehydrogenation zone, and recovering butadiene from said solution.

2. In a process of the character described wherein a hydrocarbon stock consisting principally of $C_4$ hydrocarbons containing cis-butene-2 at a temperature substantially below a dehydrogenation range of 1050° to 1250° F. is mixed with steam which is sufficiently hot to raise the mixture to said range, and wherein said mixture is passed through a dehydrogenation zone containing a dehydrogenation catalyst to convert at least a part of said cis-butene-2 to butadiene, and wherein isobutylene is produced, the improvement which consists in limiting the recycling of said isobutylene by combining the effluent from said dehydrogenation zone with fresh feed stock consisting principally of $C_4$ hydrocarbons, passing said combined effluent and feed stock into an absorbing zone at a temperature of 60° to 100° F. and a pressure of 20 to 120 p. s. i., introducing an aqueous monomethylamine solution into said absorbing zone to preferentially absorb the butadiene and cis-butene-2, said isobutylene being relatively insoluble in said solution, separating said unabsorbed isobutylene by withdrawing it from an upper part of said desorbing zone, passing said solution containing absorbed butadiene and cis-butene-2 to a primary stripping zone wherein a temperature range between 100° and 150° F. and a pressure of 70 to 250 p. s. i. are maintained, stripping said solution to remove cis-butene-2 and recycling said cis-butene-2 to the dehydrogenation zone for further conversion, passing the remaining solution to a secondary stripping zone, and separating and recovering butadiene from said solution in said secondary zone.

3. In a process of the character described wherein a hydrocarbon stock consisting principally of $C_4$ hydrocarbon containing n-butene at a temperature substantially below a dehydrogenation temperature range of 1050° to 1250° F. is mixed with steam which is sufficiently hot to raise the mixture temperature to said range, and wherein said mixture is passed through a dehydrogenation zone containing a dehydrogenation catalyst to convert at least a part of said n-butene to butadiene with incidental production of some isobutylene, the improvement which comprises adding fresh feed stock consisting principally of $C_4$ hydrocarbons to the effluent from said dehydrogenation zone, passing the combined mixture thus produced into an absorbing zone, introducing into said absorbing zone a solvent which preferentially is solvent of butadiene and unconverted n-butene and which is relatively non-solvent of isobutylene, withdrawing unabsorbed isobutylene from an upper part of said zone to prevent further recycling thereof, passing said solvent containing butadiene and n-butene to a stripping zone, stripping said solvent of n-butene and continuously recycling said n-butene to said dehydrogenation zone, and finally stripping said solvent of butadiene and returning said solvent to said absorbing zone.

4. The improvement recited in claim 3 wherein the preferential solvent is an aqueous monomethylamine solution.

5. The improvement recited in claim 3 wherein the preferential solvent is monomethylamine containing 15 to 30% water.

6. The process of producing and concentrating butadiene from hydrocarbon feed stock consisting principally of $C_4$ hydrocarbons which comprises feeding said stock, in conjunction with effluent from a dehydrogenation zone containing butadiene, n-butene and isobutylene into an absorbing zone, introducing an aqueous monomethylamine absorbing solution into said absorbing zone to selectively absorb said n-butene and said butadiene from said combined feed stock and effluent, thereby separating said isobutylene, removing said separated isobutylene from the system to prevent recycling thereof, passing the solution containing butadiene and n-butene to a stripping zone to first remove the n-butene and then to remove the butadiene from said solution, withdrawing said butadiene, recycling said n-butene to the dehydrogenation zone, dehydrogenating at least a part of said n-butene by mixing said butene with steam heated so as to bring the temperature of the mixture to a dehydrogenation temperature range of 1050° to 1250° F., passing said n-butene and steam mixture over a dehydrogenation catalyst to produce butadiene with incidental production of isobutylene, and feeding said products from said dehydrogenation zone to said absorbing zone and continuously repeating the cycle.

7. The process defined in claim 6 wherein said steam is superheated to a temperature of at least 1300° F.

EDWARD D. REEVES.

REFERENCES CITED

The following references are of record in the file of this patent:

UNITED STATES PATENTS

| Number | Name | Date |
| --- | --- | --- |
| 1,866,800 | Deanesly | July 12, 1932 |
| 1,938,083 | Mueller-Cunradi | Dec. 5, 1933 |
| 1,948,777 | Young | Feb. 27, 1934 |
| 2,209,215 | Weizevich et al. | July 23, 1940 |
| 2,265,641 | Grosskinsky et al. | Dec. 9, 1941 |
| 2,307,240 | Ruthruff | Jan. 5, 1943 |
| 2,322,122 | Frolich et al. | June 15, 1943 |
| 2,339,560 | de Simo et al. | Jan. 18, 1944 |
| 2,367,622 | Schulze et al. | Jan. 16, 1945 |
| 2,371,817 | Frey | Mar. 20, 1945 |
| 2,379,332 | Arnold | June 26, 1945 |
| 2,386,355 | Schulze et al. | Oct. 9, 1945 |
| 2,415,006 | Hachmuth | Jan. 28, 1947 |

FOREIGN PATENTS

| Number | Country | Date |
| --- | --- | --- |
| 508,764 | Great Britain | July 5, 1939 |